(12) United States Patent
Sato (10) Patent No.: US 8,514,407 B2
(45) Date of Patent: Aug. 20, 2013

(54) SURFACE SHAPE MEASUREMENT APPARATUS

(75) Inventor: Ryuichi Sato, Sendai (JP)

(73) Assignee: Canon Kabushiki Kaisha (JP)

( * ) Notice: Subject to any disclaimer, the term of this patent is extended or adjusted under 35 U.S.C. 154(b) by 423 days.

(21) Appl. No.: 12/891,648

(22) Filed: Sep. 27, 2010

(65) Prior Publication Data

US 2011/0080592 A1 Apr. 7, 2011

(30) Foreign Application Priority Data

Oct. 1, 2009 (JP) ................................. 2009-229993
Mar. 31, 2010 (JP) ................................. 2010-083399

(51) Int. Cl.
*G01B 11/02* (2006.01)

(52) U.S. Cl.
USPC ......................................................... 356/512

(58) Field of Classification Search
USPC .......................................... 356/489, 512–514
See application file for complete search history.

(56) References Cited

U.S. PATENT DOCUMENTS

| | | | |
|---|---|---|---|
| 5,003,166 A | 3/1991 | Girod | |
| 5,004,346 A | 4/1991 | Kuechel | |
| 5,625,454 A | 4/1997 | Huang et al. | |
| 7,859,683 B2 * | 12/2010 | Ko et al. | 356/512 |
| 7,869,061 B2 * | 1/2011 | Sato et al. | 356/610 |
| 2006/0114475 A1 | 6/2006 | DeGroot et al. | |
| 2007/0247639 A1 | 10/2007 | Amstel et al. | |
| 2008/0317334 A1 | 12/2008 | Hausler | |
| 2011/0080593 A1 * | 4/2011 | Sato | 356/512 |
| 2011/0080595 A1 * | 4/2011 | Sato | 356/612 |

FOREIGN PATENT DOCUMENTS

| | | |
|---|---|---|
| JP | 2764630 B2 | 6/1998 |
| JP | 2002-116010 A | 4/2002 |
| JP | 3474448 B2 | 12/2003 |
| WO | 03/001143 A2 | 1/2003 |
| WO | 03/006920 A1 | 1/2003 |

OTHER PUBLICATIONS

Search Report issued on Jan. 10, 2011 for corresponding European Patent Application No. 10180668.5-2213.
Search Report dated Jan. 10, 2011, issued for European Patent Application No. 10180680.0-2213, which is a counterpart application of the related co-pending U.S. Appl. No. 12/891,736.
Search Report dated Jan. 10, 2011, issued for European Patent Application No. 10180678.4-2213, which is a counterpart application of related co-pending U.S. Appl. No. 12/891,671.

* cited by examiner

*Primary Examiner* — Michael A Lyons
(74) *Attorney, Agent, or Firm* — Rossi, Kimms & McDowell LLP (57) ABSTRACT

An apparatus for measuring a shape of a surface, comprises a measurement head which measures a distance between a reference point and the surface by detecting interference between test light obtained when light that passes through the reference point is emitted, is reflected by the surface, and returns to the reference point, and reference light, a scanning mechanism which scans the measurement head, and a processor which calculates the shape of the surface based on the distance measured using the measurement head and coordinates of the reference point.

4 Claims, 4 Drawing Sheets

SURFACE SHAPE MEASUREMENT APPARATUS

BACKGROUND OF THE INVENTION

1. Field of the Invention

The present invention relates to a surface shape measurement apparatus for measuring a shape of a surface to be measured.

2. Description of the Related Art

In recent years, optical systems mounted in, for example, a camera, copying machine, telescope, and exposure apparatus popularly use aspherical optical elements such as aspherical lenses. Furthermore, a surface to be measured includes, for example, that having a free-form curve shape, that having significant undulation, and that having a steep slope. Therefore, a surface shape measurement apparatus is required to have a function to measure various surfaces to be detected described above. Japanese Patent Laid-Open No. 2002-116010 discloses a three-dimensional shape measurement apparatus. This measurement apparatus measures a shape of an object surface to be measured by using light (return light), which is obtained by irradiating the object surface to be measured with a spherical wave via a small aperture, reflecting the spherical wave by the object surface to be measured, and returning the reflected wave via the small aperture. More specifically, this measurement apparatus detects a tilt angle of the return light with respect to an optical axis using a tilt angle measuring unit, and detects, using a displacement amount detecting unit, a displacement amount of a distance between the reflected position of the light on the object surface to be measured and the small aperture upon scanning the object surface to be measured. Then, this measurement apparatus calculates the shape of the object surface to be measured based on the detected tilt angle and displacement amount.

In a surface shape measurement apparatus, which measures a shape by scanning a measurement head (probe), it is desirable that the measurement head is compact and lightweight. The compact measurement head contributes to a reduction of a space occupied by the measurement head in the measurement apparatus to broaden a scanning range. The lightweight measurement head contributes to stable measurement precision by eliminating a small deformation of a structure due to partial weighting on the structure of the measurement apparatus upon movement of the measurement head. Since the apparatus described in Japanese Patent Laid-Open No. 2002-116010 is required to detect both the tilt angle and displacement amount, the measurement head gets bulky and heavy accordingly.

SUMMARY OF THE INVENTION

The present invention provides a technique that is advantageous in size and reduced weight of a measurement head for a surface shape measurement apparatus.

One of aspects of the present invention provides an apparatus for measuring a shape of a surface to be measured, comprising a measurement head which measures a distance between a reference point and the surface by detecting interference between test light obtained when light that passes through the reference point is emitted, is reflected by the surface, and returns to the reference point, and reference light, a scanning mechanism which scans the measurement head, and a processor which calculates the shape of the surface based on the distance measured using the measurement head and coordinates of the reference point, wherein letting (s, t, u) be the coordinates of the reference point, q be the distance from the reference point to the surface, and (x, y, z) be coordinates of a point on the surface, the processor calculates the shape of the surface based on:

$$(xyz) = (stu) - q(\alpha\beta\gamma)$$

$$(\alpha\beta\gamma) = (\partial q/\partial s\ \partial q/\partial t\ \partial q/\partial u)$$

Further features of the present invention will become apparent from the following description of exemplary embodiments with reference to the attached drawings.

DESCRIPTION OF THE EMBODIMENTS

A surface shape measurement apparatus according to the present invention is suited to measuring surface shapes of smoothly continuous objects such as lenses, mirrors, and molds used in, for example, a camera (including a video camera), copying machine, telescope, and exposure apparatus.

Figure 3:
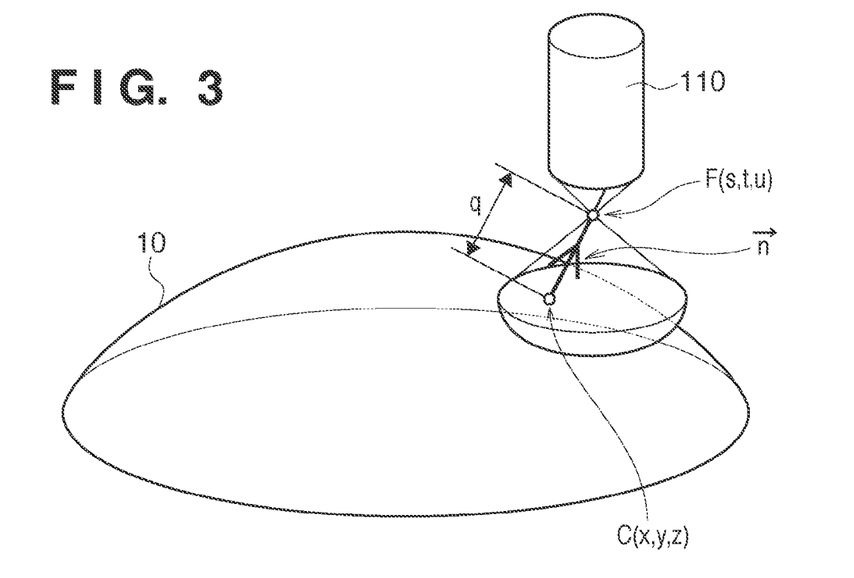
FIG. 3 is a schematic view showing the arrangement of the surface shape measurement apparatus according to the first embodiment of the present invention.

The basic principle of the surface shape measurement apparatus according to the present invention will be described first. FIG. 3 shows related parameters. The surface shape measurement apparatus has a measurement head 110 required to measure a surface shape of a surface 10 to be measured. FIG. 3 illustrates a case in which the measurement head 110 emits a spherical wave and the center of that spherical wave is set as a reference point. A point F(s, t, u) represents coordinates of a center of a spherical wave emitted from the measurement head 110, that is, a reference point. A point C(x, y, z) represents coordinates of a point where the spherical wave having the point F(s, t, u) as the center is reflected by the surface 10, and returns to the point F.

Reference symbol q denotes a distance between the point C(x, y, z) and point F(s, t, u), that is equivalent to the perpendicular distance from the point F to the surface 10. $n = (\alpha, \beta, \gamma)$ is a unit normal vector at the point C(x, y, z) of the surface 10. The surface shape measurement apparatus measures the coordinates of the point F(s, t, u) and the distance q while scanning the measurement head 110, and decides a coordinate group of the points C(x, y, z), that is, a surface shape on the surface 10 based on the measurement result.

Since the point C(x, y, z) is located on a spherical surface having the point F(s, t, u) as the center and a radius q, we have:

$$(x-s)^2 + (y-t)^2 + (z-u)^2 = q^2 \qquad (1)$$

Partial differentiations of both the sides of equation (1) yield:

$$x = s - q\partial q/\partial s$$
$$y = t - q\partial q/\partial t$$
$$z = u - q\partial q/\partial u \quad (2)$$

Therefore, by measuring the reference point position F(s, t, u) of the measurement head 110, and the distance q from the point F(s, t, u) to the surface 10, a coordinate group of points on the surface 10, that is, the surface shape of the surface 10 can be calculated according to equations (2). The present invention adopts this as the basic principle.

According to a property of the unit normal vector, since $\alpha = \partial q/\partial s$, $\beta = \partial q/\partial t$, and $\gamma = \partial q/\partial u$, equations (2) can be expressed in a vector format like:

$$(xyz) = (stu) - q(\alpha\beta\gamma) \quad (3)$$
$$(\alpha\beta\gamma) = (\partial q/\partial s\, \partial q/\partial t\, \partial q/\partial u) \quad (4)$$

Using equation (4), a unit normal vector ($\alpha$, $\beta$, $\gamma$) can be obtained from the reference point position F(s, t, u) of the measurement head 110 and the perpendicular distance q from the point F to the surface 10. Substituting this unit normal vector in equation (3) can yield a shape (x, y, z) of the surface to be measured. The basic principle has been described.

In processing of discrete measurement data, since partial differentials are handled as differences, equation (5) as a difference format equivalent to equation (4) is applied.

$$(\Delta s, \Delta t, \Delta u)\begin{pmatrix}\alpha \\ \beta \\ \gamma\end{pmatrix} = \Delta q \quad (5)$$

First Embodiment

Figure 1A:
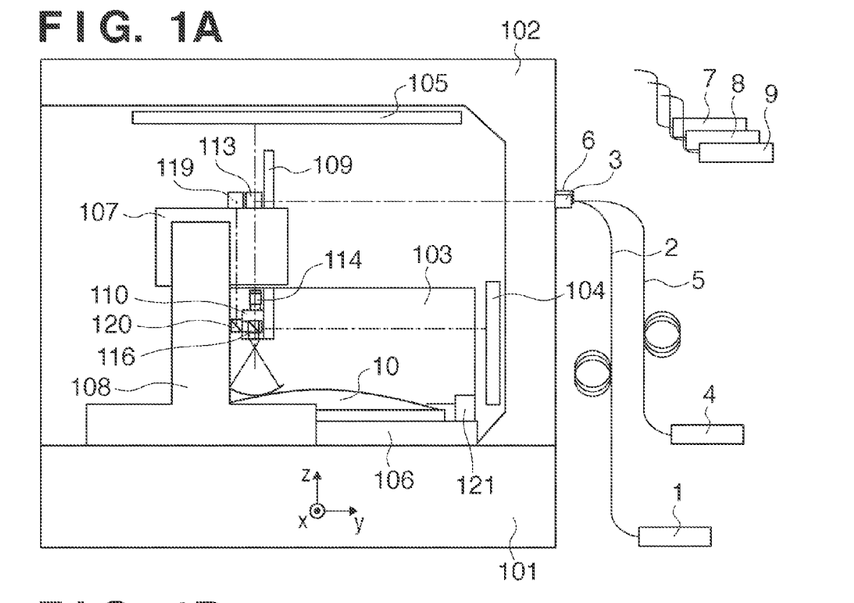
FIGS. 1A and 1B are schematic views showing the arrangement of a surface shape measurement apparatus according to an embodiment of the present invention.
Figure 1B:
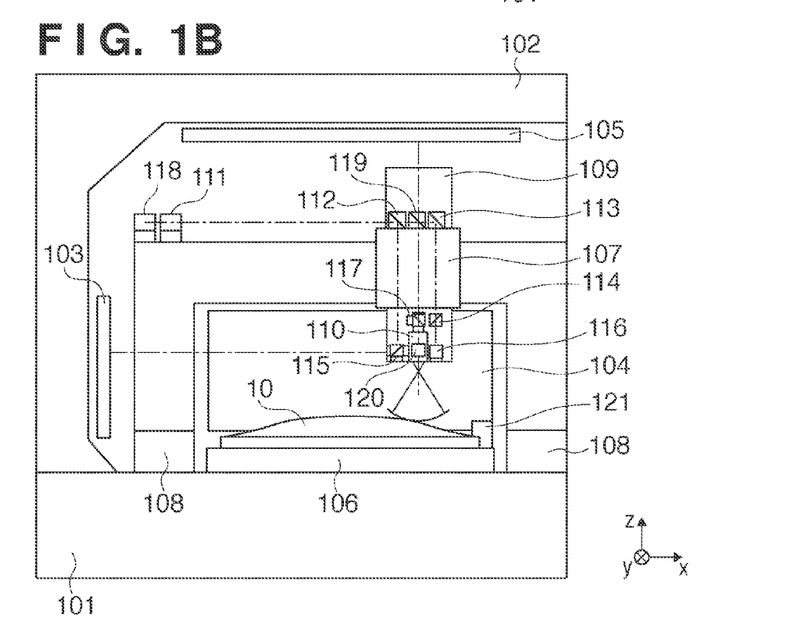

FIGS. 1A and 1B are schematic views showing the arrangement of a surface shape measurement apparatus according to the first embodiment of the present invention. FIG. 1A is a front view, and FIG. 1B is a side view. In this case, an xyz coordinate system is defined, as shown in FIGS. 1A and 1B. The surface shape measurement apparatus includes a base plate 101, a reference frame 102 supported by the base plate 101, a work holder 106 supported by the base plate 101, and a measurement head 110. The work holder 106 holds an object to be measured having a surface 10 to be measured. The surface shape measurement apparatus includes a reference plane mirror 103 required to measure an x position of the measurement head 110, a reference plane mirror 104 required to measure a y position of the measurement head 110, and a reference plane mirror 105 required to measure a z position of the measurement head 110. These mirrors are attached to the reference frame 102.

The surface shape measurement apparatus further includes, as a scanning mechanism for scanning the measurement head 110, an XYZ stage mechanism including an X-slide 107, Y-slide 108, and Z-slide 109. The measurement head 110 is mounted on the Z-slide 109, which is mounted on the X-slide 107 and is driven in a z-axis direction by a driving mechanism (not shown). The X-slide 107 is mounted on the Y-slide 108, and is driven in an x-axis direction by a driving mechanism (not shown). The Y-slide 108 is mounted on the base plate 101, and is driven in a y-axis direction by a driving mechanism (not shown). Hence, the surface shape measurement apparatus has an arrangement which can three-dimensionally change a relative positional relationship between the measurement head 110 and surface 10 to be measured.

A laser beam emitted from a 2-frequency oscillation laser 1 for heterodyne interferometric distance measurement is guided to a fiber input collimator 3 via a polarization maintaining fiber 2. The laser beam emerging from the collimator 3 is reflected by a mirror 111 attached to the Y-slide 108. After that, the laser beam is guided to laser interferometers 115, 116, and 117 by a non-polarizing beam splitter 112 and reflecting prism 113 attached on the X-slide 107 and a non-polarizing beam splitter 114 attached on the Z-slide 109. In this case, the laser interferometers 115, 116, and 117 are those for respectively measuring the x, y, and z positions. Interference signals obtained by the laser interferometers 115, 116, and 117 are provided to a signal processing unit 7 via an optical fiber (not shown). The X-, Y-, and Z-slides 107, 108, and 109 are controlled by an XYZ stage control unit 8.

A computer (processor) 9 includes a function of setting a scanning path of the measurement head 110, a function of acquiring a measurement data group, a function of calculating the surface shape of the surface 10 as a three-dimensional coordinate group, a function of calibrating the coordinates of the scanning path, and a function of correcting the measurement result of the surface shape of the surface 10. The computer 9 generates a coordinate group that expresses the scanning path, and the control unit 8 of the XYZ stage mechanism controls driving mechanisms (not shown) in the XYZ stage mechanism based on the coordinate group, thereby scanning the measurement head 110 along the scanning path. The computer 9 acquires, as a measurement data group, the distance information q from the measurement head 110 on the scanning path and the position information of the measurement head 110 from the laser interferometers 115, 116, and 117 via the signal processing unit 7. The computer 9 executes arithmetic processing of the acquired measurement data group to calculate the surface shape of the surface 10 as a three-dimensional coordinate group, to calibrate the coordinates of the scanning path, and to correct the measurement result of the surface shape of the surface 10.

The surface shape measurement apparatus includes an origin unit 121 which specifies an origin of the xyz coordinate system of the surface shape measurement apparatus. The origin unit 121 includes a concave spherical surface (not shown), and the center of curvature of that spherical surface is specified as the origin of the xyz coordinate system of the surface shape measurement apparatus.

A laser unit 4 is a light source which provides a light beam to the measurement head 110. The laser unit 4 provides, to the measurement head 110, two light beams for heterodyne interferometric distance measurement (the directions of polarization of these light beams are perpendicular to each other, and they have slightly different frequencies) by emitting the light beams onto a single optical path. The laser unit 4 generates a reference beat signal including beats based on a frequency difference of the two light beams to be provided to the measurement head 110, and provides the generated signal to the signal processing unit 7. The laser beams emitted by the laser unit 4 are guided to a beam expander 201 of the measurement head 110 shown in FIG. 2 via a polarization maintaining fiber 5, fiber input collimator 6, and mirrors 118, 119, and 120.

The measurement head 110 will be described below with reference to FIG. 2. The measurement head 110 configures a Twyman-Green interferometer. An illumination optical system is configured by the beam expander 201, a polarizing beam splitter 202, a λ/4 plate 209, and an objective lens 210. A light receiving optical system is configured by the objective lens 210, the λ/4 plate 209, the polarizing beam splitter 202, a condenser lens 205, and a shielding member 207. S-polarized light components of a light beam emerging from the beam expander 201 are transmitted through the polarizing beam splitter 202, and its P-polarized light components are reflected by the splitter 202, thus splitting the light beam into linearly polarized light components having orthogonal directions of polarization. The transmitted light beam travels toward a reference surface 204 side, and the reflected light beam travels toward the surface 10 side.

The light beam which travels toward the reference surface 204 side is converted into circularly polarized light by a λ/4 plate 203, and is reflected in a normal direction by the reference surface 204. This light beam is transmitted through the λ/4 plate 203 again, is converted into linearly polarized light, and returns to the polarizing beam splitter 202. In this case, since this light beam is linearly polarized light of S-polarized light components with respect to the polarizing beam splitter 202, it is reflected by the splitter 202 and travels toward the condenser lens 205 side.

On the other hand, the light beam which travels toward the surface 10 side is converted into circularly polarized light by the λ/4 plate 209, and enters the objective lens 210. This light beam is converted into a spherical wave having a focal point 211 (point F) of the objective lens 210 as the center of curvature, and is then reflected by the surface 10.

Of light beam components reflected by the surface 10, a light beam 212 reflected in a normal direction of the surface 10 goes back through the objective lens 210 as test light and returns to the λ/4 plate 209. In this case, since this light beam is linearly polarized light of P-polarized light components with respect to the polarizing beam splitter 202, it is transmitted through the splitter 202 and travels toward the condenser lens 205 side. Light (reference light) reflected by the reference surface 204 and light (test light) reflected by the surface 10 form an interference wave, which reaches an interference signal detecting unit 208 via the condenser lens 205, thus detecting a measurement beat signal. This measurement beat signal is provided to the signal processing unit 7 via a cable 213. The signal processing unit 7 integrates a frequency difference between the reference beat signal provided from the laser unit 4 and the measurement beat signal provided from the signal detecting unit 208, thereby detecting a change in optical path length between the reference surface 204 and surface 10.

Figure 2:
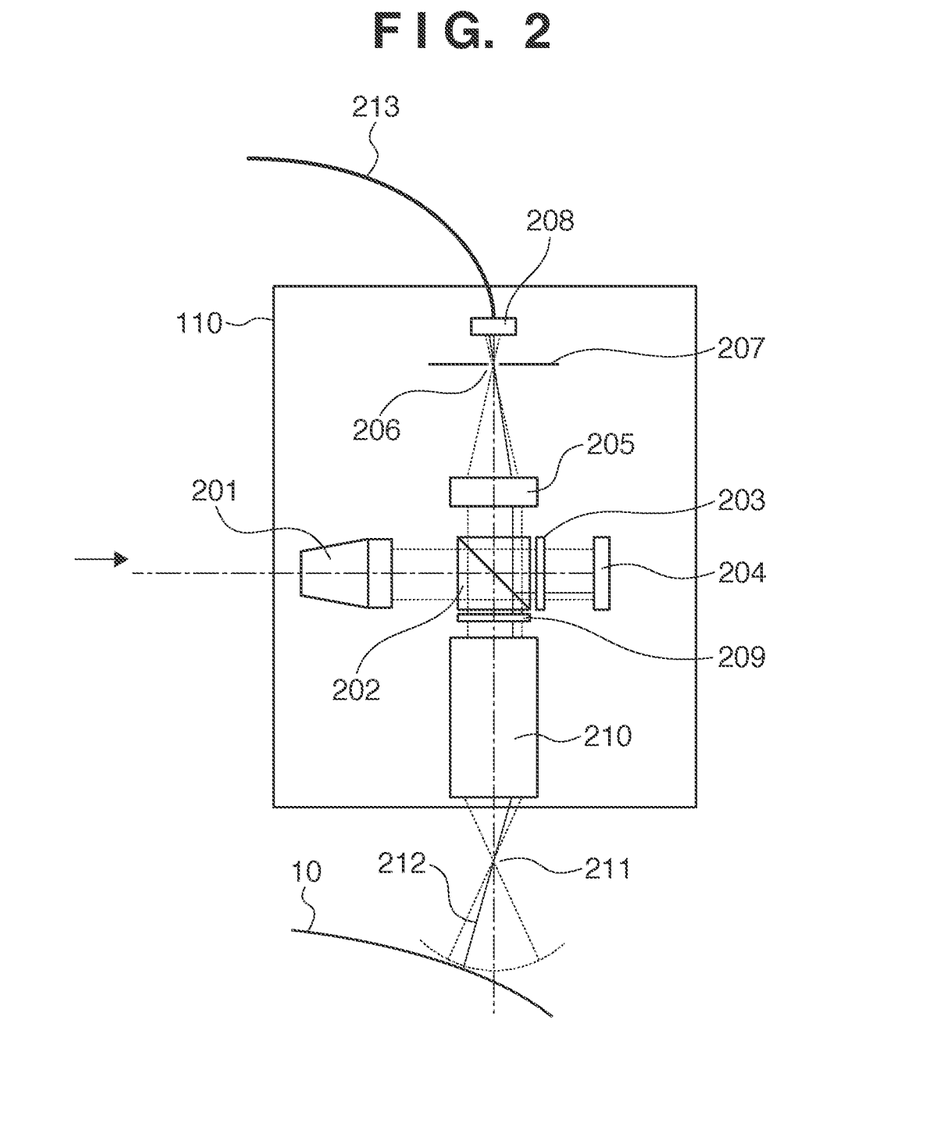
FIG. 2 is a schematic view showing the arrangement of a measurement head according to the embodiment of the present invention.

In FIG. 2, a focal point 206 of the condenser lens 205 has a conjugate relationship to the focal point 211 (point F) of the objective lens 210. The shielding member 207 passes only a light beam which is focused on the focal point 206 of the condenser lens 205 and near the focal point 206 through itself. Then, only the light beam 212, which is reflected in the normal direction to the surface 10, of those reflected by the surface 10, enters the interference signal detecting unit 208. Therefore, a change in optical path length between the reference surface 204 and surface 10, which is detected by the signal processing unit 7, is equivalent to a change in optical path length between the focal point 211 and a portion on the surface 10 that reflects the light beam in the normal direction to the surface 10. In this way, a distance between the focal point 211 and the portion on the surface 10 that reflects the light beam in the normal direction to the surface 10 can be detected. In the aforementioned arrangement, the focal point 211 is set as the center of the spherical wave, that is, the reference point. Since the shielding member 207 is arranged between the condenser lens 205 and interference signal detecting unit 208, no member is arranged at the focal point 211 as the center of the spherical wave, that is, the reference point, thus broadening the scanning range of the measurement head 110.

However, a change in optical path length cannot often be correctly obtained depending on the shape of the surface 10. For example, this is the case when the surface 10 has a common center of curvature over a broad region, and the position of the center of curvature of the surface 10 matches the reference point F on the scanning path. In this case, since reflected light from the broad region of the surface 10 returns to only the vicinity of the center of curvature, an interference signal cannot be obtained even by a slight scan. For example, such phenomenon may occur when the surface 10 is a spherical surface. In such case, by setting the scanning path to be sufficiently separated away from the center of curvature of the surface to be measured, a change in optical path length can be correctly obtained. Therefore, it becomes possible to measure the shape of the surface 10.

Also, a change in optical path length cannot be correctly obtained when the surface 10 has two or more intersecting normals, and an intersection of the two or more normals on the surface 10 matches the reference point F on the scanning path. This is because interferences caused by reflected light beams from a plurality of different regions take place. Even in such case, by setting the scanning path to be sufficiently separated away from the intersection of the two or more normals on the surface to be measured, a change in optical path length can be correctly obtained. Therefore, it becomes possible to measure the shape of the surface 10.

As described above, the point $F(s, t, u)$ represents the coordinates of the center, that is, the reference point of a spherical wave emitted from the measurement head 110. The point $C(x, y, z)$ represents the coordinates of a point where the spherical wave having the point $F(s, t, u)$ as the center is reflected by the surface 10 in the normal direction. Reference symbol q denotes the distance between the point $C(x, y, z)$ and the point $F(s, t, u)$. $n=(\alpha, \beta, \gamma)$ is a unit normal vector at the point $C(x, y, z)$ on the surface 10.

The coordinates of the point $F(s, t, u)$ are measured using the laser interferometers 115, 116, and 117, as will be described in detail later. The distance q between the point $C(x, y, z)$ and point $F(s, t, u)$ is measured using the measurement head 110, as will be described in detail later. As described above, the point $C(x, y, z)$ on the surface 10 can be expressed by equations (3), (4), and (5). The laser interferometers 115, 116, and 117 measure the position of the point F while scanning the measurement head 110 along the scanning path, the measurement head 110 measures the distance q. Then, according to equations (3), (4), and (5), a coordinate group of the point C on the surface 10, that is, a surface shape can be calculated.

When the laser interferometers 115, 116, and 117 measure the position of the point $F(s, t, u)$ while scanning the measurement head 110 along the scanning path, and the measurement head 110 measures the distance q, the following measurement data group can be obtained. Note that suffixes $1, 2, \ldots, j, \ldots, N$ mean data numbers.

$(s_1, t_1, u_1), q_1$
$(s_2, t_2, u_2), q_2$
$\vdots$
$(s_j, t_j, u_j), q_j$
$\vdots$
$(s_N, t_N, u_N), q_N$ Of this data group, a unit normal vector $n_j=(\alpha_j, \beta_j, \gamma_j)$ at the j-th measurement point can be calculated as follows.

As measurement points located in the vicinity of the j-th point, (k+1) measurement points including the j-th measurement point are selected. In this case, at least three points of the (k+1) measurement points are selected not to be aligned on an identical line. By applying the relationship of equation (5) above, the following simultaneous equation is obtained.

$$\begin{pmatrix} \Delta s_{j1}, & \Delta t_{j1}, & \Delta u_{j1} \\ \Delta s_{j2}, & \Delta t_{j2}, & \Delta u_{j2} \\ \vdots & \vdots & \vdots \\ \Delta s_{jk}, & \Delta t_{jk}, & \Delta u_{jk} \end{pmatrix} \begin{pmatrix} \alpha_j \\ \beta_j \\ \gamma_j \end{pmatrix} = \begin{pmatrix} \Delta q_{j1} \\ \Delta q_{j2} \\ \vdots \\ \Delta q_{jk} \end{pmatrix} \quad (6)$$

where
$(\Delta s_{jm}, \Delta t_{jm}, \Delta u_{jm}) = (s_{jm}, t_{jm}, u_{jm}) - (s_j, t_j, u_j)$,
$\Delta q_{jm} = q_{jm} - q_j$,
$(s_{jm}, t_{jm}, u_{jm})$: a measurement point located in the vicinity of the j-th measurement point,
$q_{jm}$: a distance between the points C and F at a measurement point located in the vicinity of the m-th measurement point, and
m=1, 2, ..., k.

From a property of the unit normal vector, we have:

$$\alpha_j^2 + \beta_j^2 + \gamma_j^2 = 1 \quad (7)$$

Equation (6) includes two or more independent rows depending on the method of selecting the measurement points. Therefore, by applying a least square method to equation (6) under the condition of equation (7), the unit normal vector $n = (\alpha_j, \beta_j, \gamma_j)$ at the j-th measurement point can be decided. By applying this result to equation (3), coordinates $C_j(x_j, y_j, z_j)$ of the surface 10 at the j-th measurement point are specified by:

$$(x_j, y_j, z_j) = (s_j, t_j, u_j) - q_j(\alpha_j, \beta_j, \gamma_j) \quad (8)$$

By making these calculations for the respective measurement points, a set of coordinate points which express the surface shape of the surface 10 can be decided like:

$$\begin{aligned} &(x_1, y_1, z_1) \\ &(x_2, y_2, z_2) \\ &\vdots \\ &(x_j, y_j, z_j) \\ &\vdots \\ &(x_N, y_N, z_N) \end{aligned} \quad (9)$$

A method of measuring the reference point F(s, t, u) of the measurement head 110 by the laser interferometers 115, 116, and 117 will be described below. Normally, a laser interferometer measures a position by detecting a displacement amount from an origin since it is an incremental distance measuring device. In this embodiment, the origin unit 121 is used as an arrangement for providing an origin. Assume that the center, that is, the reference point F of a spherical wave emitted by the measurement head 110 is matched with the origin of the surface shape measurement apparatus provided by the origin unit 121, and values provided by the laser interferometers 115, 116, and 117 at that time are those corresponding to the origin.

Figure 4:
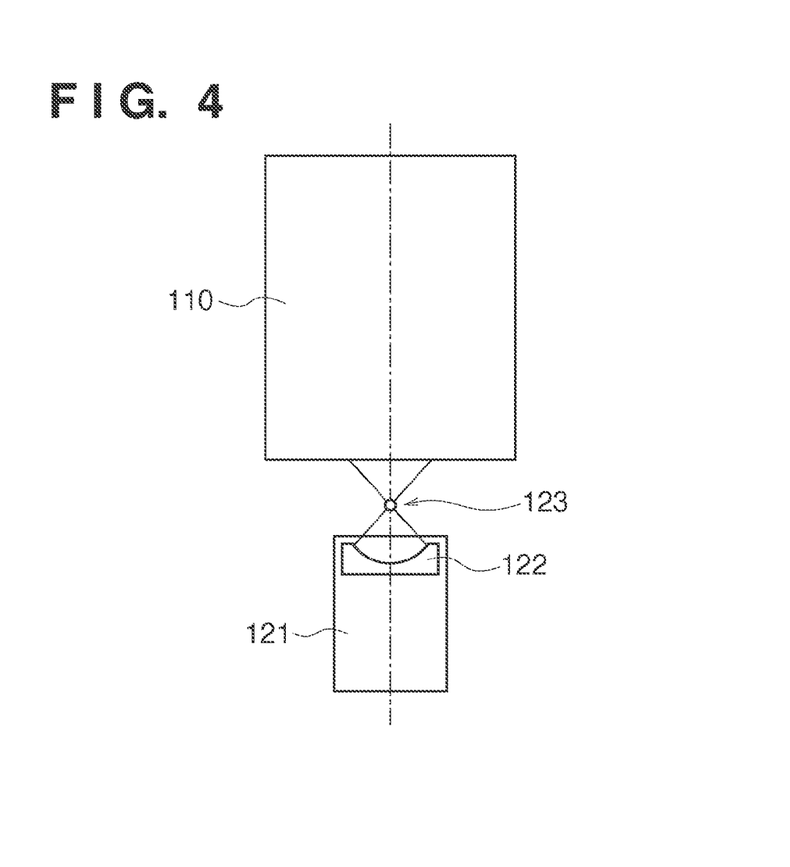
FIG. 4 is a view for explaining a method of deciding an origin of the measurement head.

The method will be described in detail below with reference to FIG. 4. The center of curvature of a concave spherical surface 122 included in the origin unit 121 is an origin 123 of the surface shape measurement apparatus. When this origin 123 matches the center, that is, the reference point F of a spherical wave emitted from the measurement head 110, since all light beams reflected by the concave spherical surface 122 return to the measurement head 110, the amplitude of a measurement beat signal provided to the signal processing unit 7 is maximized. Based on a position of the maximum amplitude of the measurement beat signal, it is determined that the origin of the surface shape measurement apparatus provided by the origin unit 121 matches the reference point F of a spherical wave emitted from the measurement head 110. Assume that values provided from the laser interferometers 115, 116, and 117 at that time are those corresponding to the origin.

A method of measuring the distance q between the central point, that is, the reference point F of a spherical wave emitted from the measurement head 110 and the point C where the spherical wave is reflected by the surface 10 in the normal direction by the measurement head 110 will be described below. The measurement head 110 also configures an incremental distance measuring device. Hence, a value provided from the measurement head 110 in a state in which a distance between the central point, that is, the reference point F of a spherical wave emitted from the measurement head 110 and the point C where the spherical wave is reflected by the surface 10 in the normal direction is known is used as a reference value. Then, a change amount from that value is converted into a displacement amount, thereby measuring the distance q.

Figures 5A, 5B:
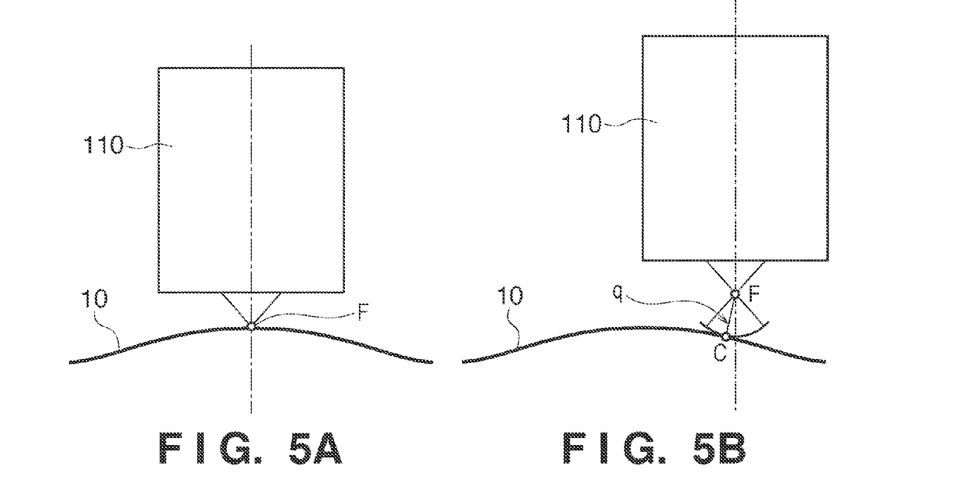
FIGS. 5A and 5B are views for explaining a method of deciding a reference required to calculate a distance from the measurement head.
Figure 6:
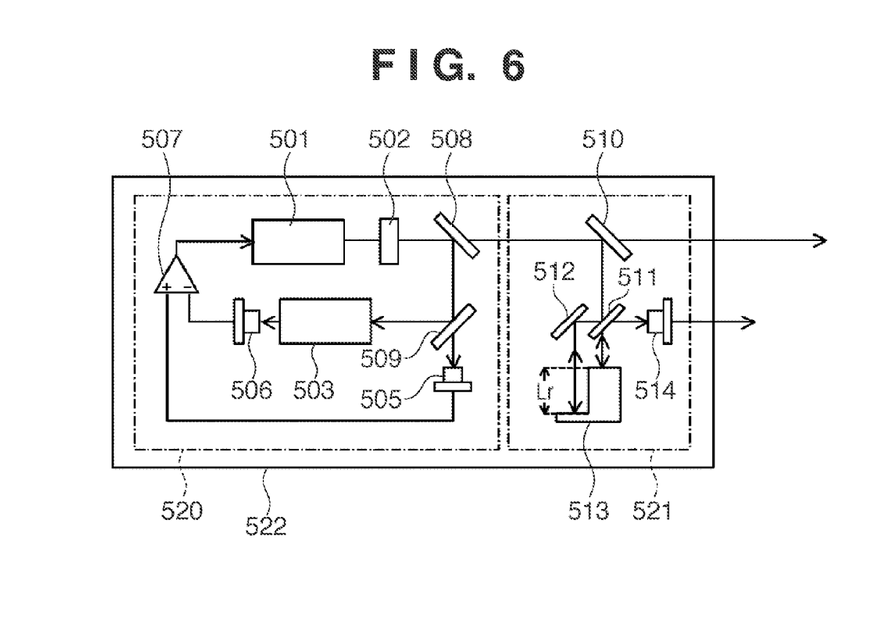
FIG. 6 is a view showing an arrangement for absolute distance measurement.

This method will be described in more detail below with reference to FIGS. 5A and 5B. FIG. 5A shows a state in which the measurement head 110 is aligned so that the central point, that is, the reference point F of a spherical wave emitted from the measurement head 110 matches a point on the surface 10. At this time, the distance q is zero. Also, since a spherical wave emitted from the measurement head 110 in this case is reflected by the surface 10 in an apex reflection state (so-called cat's eye state), a light beam of the largest amount returns to the measurement head 110. Therefore, the amplitude of a measurement beat signal provided to the signal processing unit 7 is maximized. A measurement value corresponding to the maximum amplitude of the measurement beat signal can be decided as a reference value $Q_0$ of the distance q between the central point, that is, the reference point F of a spherical wave emitted from the measurement head 110 and the point C where the spherical wave is reflected by the surface 10 in the normal direction. FIG. 5B shows a state in which the measurement head 110 is scanned to be moved from the state shown in FIG. 5A to another position. As described above, the measurement head 110 has the arrangement for measuring a change in optical path length between the focal point 211, that is, the point F, and the portion C where a spherical wave is reflected by the surface 10 in the normal direction. Therefore, letting Q be a read value at that time, the distance q to be calculated is expressed by:

$$q = Q - Q_0 \quad (10)$$

As described above, the surface shape of the surface 10 can be measured by measuring the position of the reference point F of the measurement head 110 and the perpendicular distance q from the reference point F to the surface 10 while scanning the measurement head 110.

A perpendicular distance q can be measured by, for example, an absolute distance measuring device. Japanese Patent No. 2764630 discloses an absolute distance measuring device. The absolute distance measuring device disclosed in Japanese Patent No. 2764630 has a function of specifying orders of interference of interference fringes of light, and measures an absolute distance to an object using this function.

The absolute distance measuring device includes (a) a light source which can continuously change a frequency of output light within a predetermined range, and (b) a frequency stabilizing unit of the light source. The absolute distance measuring device also includes (c) an interference phase measuring unit which measures an interference phase between reflected light from the object and reference light, and (d) a unit which has at least one length reference, and measures an interference phase obtained to have the length reference as an optical path difference. The frequency stabilizing unit includes a light absorbing cell, light sensor, and feedback unit. The light absorbing cell has a light absorbing peak in a specific frequency range, and receives the output light of the light source. The light sensor measures the intensity of light which has passed through the light absorbing cell. The feedback unit detects based on a decrease in output from the light sensor that the frequency of the output light of the light source reaches the frequency of the absorbing peak of the light absorbing cell, and feeds back a control signal to the light source. The frequency stabilizing unit fixes the frequency of the light source at the frequency of the absorbing peak when the frequency of the light source matches that of the absorbing peak.

In one embodiment of the present invention, the absolute distance measuring device is configured to include a light source unit 522, interference phase measuring unit, and arithmetic unit, which are exemplified in FIG. 8. The light source unit 522 can be used as the laser unit 4 shown in FIGS. 1A and 1B. The light source unit 522 can include a light source 520 and correction unit 521. The interference phase measuring unit is configured by the measurement head 110. The arithmetic unit can be incorporated in the signal processing unit 7.

The light source 520 includes a DBR laser 501, collimator lens 502, half mirrors 508 and 509, Rb gas cell 503, light sensor (photodiode) 505, light sensor 506, and comparator 507. The DBR laser 501 can change an oscillation frequency by a driving current. The light sensor 505 directly measures the intensity of output light of the DBR laser 501. The light sensor 506 measures the intensity of a laser beam which has passed through the Rb cell 503.

The correction unit 521 includes half mirrors 510 and 511, reflecting mirror 512, reference gap (made up of a material having a small coefficient of thermal expansion such as ZERODUR or Superinvar) 513 having a reference length Lr, and light sensor 514. A light beam generated by the light source 520 emerges from the light source 522 via the half mirror 510. This light beam is guided to a beam expander 201 of the measurement head 110 exemplified in FIG. 2 via a polarization maintaining fiber 5, fiber input collimator 6, and mirrors 118, 119, and 120. The measurement head 110 serves as the interference phase measuring unit, and provides its detection signal to the signal processing unit 7. A detection signal of the light sensor 514 of the correction unit 521 is also provided to the signal processing unit 7. The arithmetic unit incorporated in the signal processing unit 7 receives the detection signal from the measurement head 110 and that from the light sensor 514 of the correction unit 521, and absolutely calculates the distance q based on these detection signals.

Note that the measurement head 110 of this embodiment emits a spherical wave from the reference point F at one time. However, the measurement head 110 may be configured to emit a narrow light beam corresponding to a part of the spherical wave from the reference point, so as to scan an incident region of the spherical wave on the surface 10 by that narrow light beam. With this configuration of the measurement head 110, since the detecting unit 208 detects test light reflected by only a narrow region on the surface 10, noise components included in the detection result can be reduced. Since only the narrow region is irradiated with all the light beams from the light source, a low-output light source can be used.

According to this embodiment, the surface shape of the surface to be measured can be measured by measuring only the distance q without measuring an angle of a light beam which passes through the reference point, is reflected by the surface to be measured, and returns to the reference point. Therefore, the measurement head can have a simple arrangement, thus achieving size and reduced weight of the measurement head.

Furthermore, using the absolute distance measuring device, even when a light beam from a surface to be measured is interrupted (for example, when a surface to be measured is a discontinuous surface including steps and holes, or when foreign matters or scratches are present on the surface to be measured), the distance q can be measured. Therefore, using the absolute distance measuring device, even when a light beam from the surface to be measured is interrupted, the shape of the surface to be measured can be measured.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application Nos. 2009-229993 and 2010-083399 filed Oct. 1, 2009 and Mar. 31, 2010, respectively, which are hereby incorporated by reference herein in their entirety.

What is claimed is:

1. An apparatus for measuring a shape of a surface to be measured, the apparatus comprising:
a measurement head which measures a distance between a reference point and a point of the surface by detecting interference between test light and reference light, wherein the test light emits through the reference point from the measurement head, reflects off the surface, and returns to the reference point;
a scanning mechanism which scans the measurement head; and
a processor which calculates the shape of the surface based on the distance measured using the measurement head and coordinates of the reference point,
wherein, letting (s, t, u) be the coordinates of the reference point, (x, y, z) be coordinates of the point on the surface, q be the distance from the reference point to the point on the surface, and ($\alpha$ $\beta$ $\gamma$) be a unit normal vector at the point on the surface, the processor calculates:
($\alpha$ $\beta$ $\gamma$) using the measured q based on: ($\alpha$ $\beta$ $\gamma$)=($\partial q/\partial s$ $\partial q/\partial t$ $\partial q/\partial u$); and
the shape of the surface using the calculated ($\alpha$ $\beta$ $\gamma$) and the measured q based on:

$$(xyz)=(stu)-q(\alpha\beta\gamma), \text{ and}$$

wherein the scanning mechanism scans the measurement head so that that the reference point is positioned at a plurality of positions,
wherein the measurement head measures the distance q for each of the plurality of positions, and
wherein the processor calculates the unit normal vectors ($\alpha$ $\beta$ $\gamma$) based on the coordinates of the plurality of positions and the distances q respectively corresponding to the plurality of positions.

2. The apparatus according to claim 1, wherein the measurement head emits a spherical wave having the reference point as a center.

3. The apparatus according to claim 1, wherein the distance is absolutely measured using the measurement head.

4. The apparatus according to claim 1, wherein the measurement head emits a light beam corresponding to a part of a spherical wave so that the light beam passes through the reference point, is reflected by the surface, and returns to the reference point.

* * * * *